(12) United States Patent
Jeong et al.

(10) Patent No.: US 12,530,806 B2
(45) Date of Patent: Jan. 20, 2026

(54) METHOD FOR DECODING IMMERSIVE VIDEO AND METHOD FOR ENCODING IMMERSIVE VIDEO

(71) Applicant: Electronics and Telecommunications Research Institute, Daejeon (KR)

(72) Inventors: Jun Young Jeong, Daejeon (KR); Gwang Soon Lee, Daejeon (KR); Dawid Mieloch, Poznań (PL); Marek Domański, Poznań (PL); Adrian Dziembowski, Poznań (PL); Błazej Szydełko, Poznań (PL); Dominika Klóska, Poznań (PL)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 424 days.

(21) Appl. No.: 18/096,455

(22) Filed: Jan. 12, 2023

(65) Prior Publication Data

US 2023/0230285 A1    Jul. 20, 2023

(30) Foreign Application Priority Data

Jan. 14, 2022  (KR) .................. 10-2022-0006194
Jan. 10, 2023  (KR) .................. 10-2023-0003378

(51) Int. Cl.
*G06T 7/90*     (2017.01)
*G06T 7/40*     (2017.01)
(Continued)

(52) U.S. Cl.
CPC ............. *G06T 9/00* (2013.01); *G06T 7/40* (2013.01); *G06T 7/50* (2017.01); *G06V 10/761* (2022.01); *G06V 10/764* (2022.01)

(58) Field of Classification Search
CPC .... G06T 9/00; G06T 7/40; G06T 7/50; G06T 7/529; G06T 15/00; G06T 15/04;
(Continued)

(56) References Cited

U.S. PATENT DOCUMENTS

2020/0380765 A1    12/2020  Thudor et al.
2020/0413094 A1*   12/2020  Lee ..................... H04N 19/167
(Continued)

FOREIGN PATENT DOCUMENTS

WO          2021/067503      4/2021

OTHER PUBLICATIONS

Kloska et al., "Decoder-side depth estimation with input depth assistance", ISO/IEC JTC 1/SC 29/WG 04 m58048, Oct. 2021, pp. 1-5.

*Primary Examiner* — Duy M Dang
(74) *Attorney, Agent, or Firm* — KILE PARK REED & HOUTTEMAN PLLC

(57) ABSTRACT

A method of encoding an immersive image according to the present disclosure comprises classifying a plurality of view images into a basic image and an additional image, generating a plurality of texture atlases based on the plurality of view images, generating a first depth atlas including depth information of view images included in a first texture atlas among the plurality of texture atlases, and generating a second depth atlas including depth information of view images included in remaining texture atlases other than the first texture atlas.

8 Claims, 10 Drawing Sheets

(51) Int. Cl.
　　　*G06T 7/50*　　　　(2017.01)
　　　*G06T 9/00*　　　　(2006.01)
　　　*G06V 10/74*　　　(2022.01)
　　　*G06V 10/764*　　(2022.01)

(58) Field of Classification Search
　　　CPC .... G06V 10/74; G06V 10/761; G06V 10/764; G06V 20/64; G06V 20/647; H04N 19/597; H04N 19/176; H04N 19/122; H04N 19/66
　　　USPC ........................................................ 382/232
　　　See application file for complete search history.

(56) References Cited

U.S. PATENT DOCUMENTS

2021/0006834 A1* 1/2021 Salahieh .............. H04N 19/597
2021/0409726 A1 12/2021 Shin et al.
2022/0122217 A1 4/2022 Lee et al.

* cited by examiner

[FIG. 1]
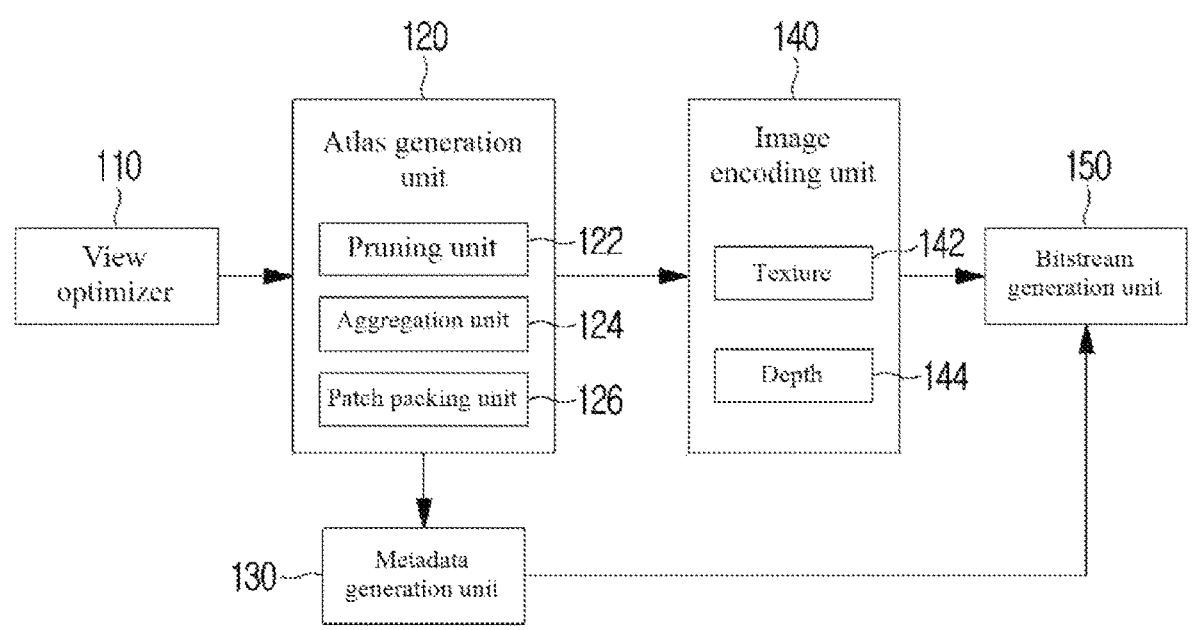

[FIG. 2]
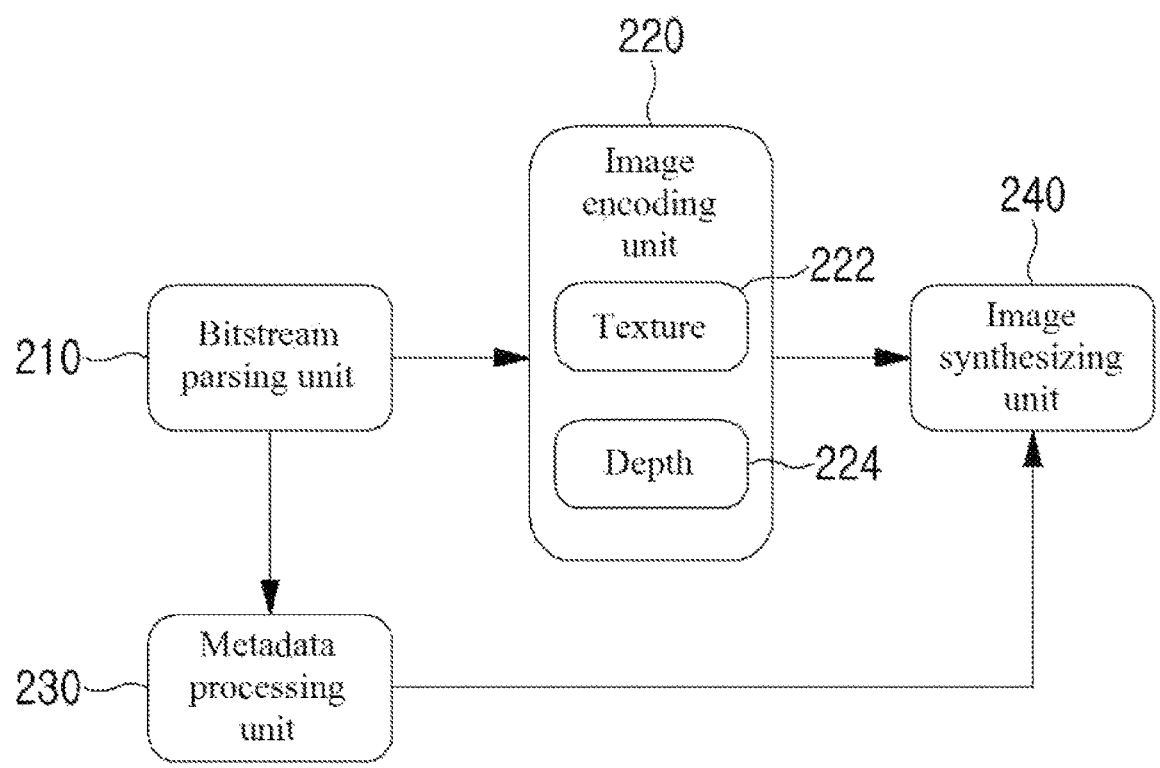

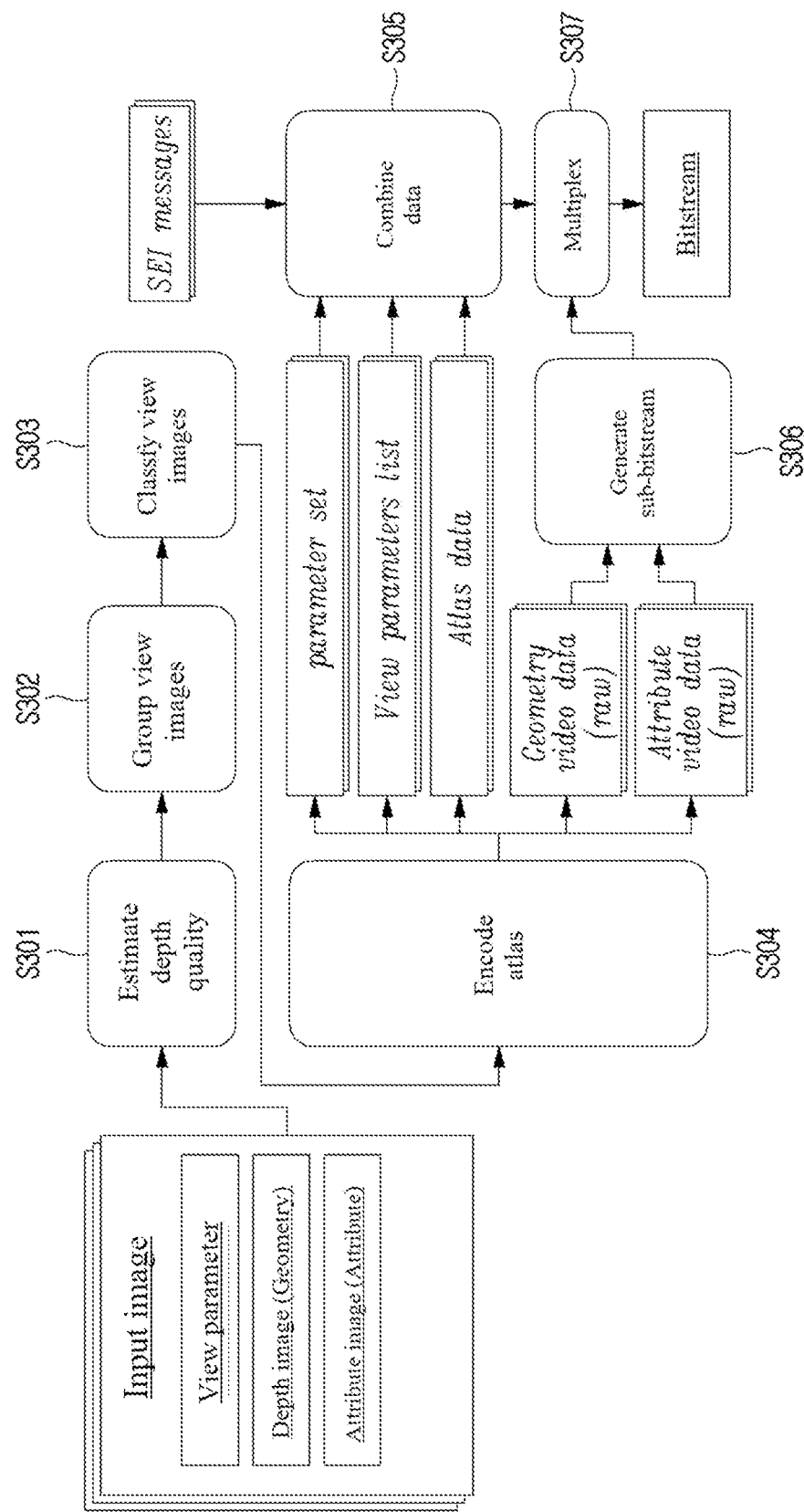

[FIG. 4]
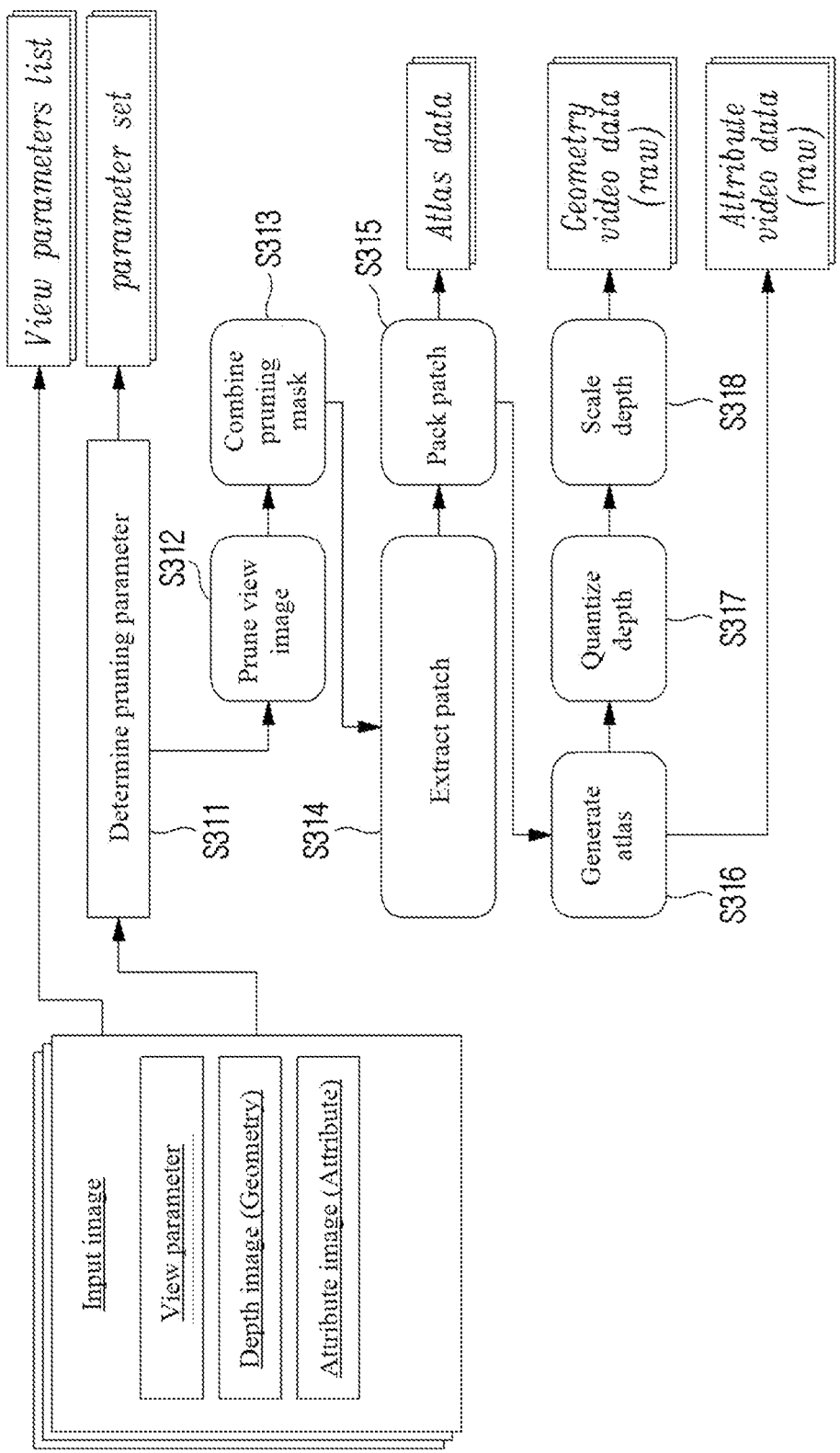

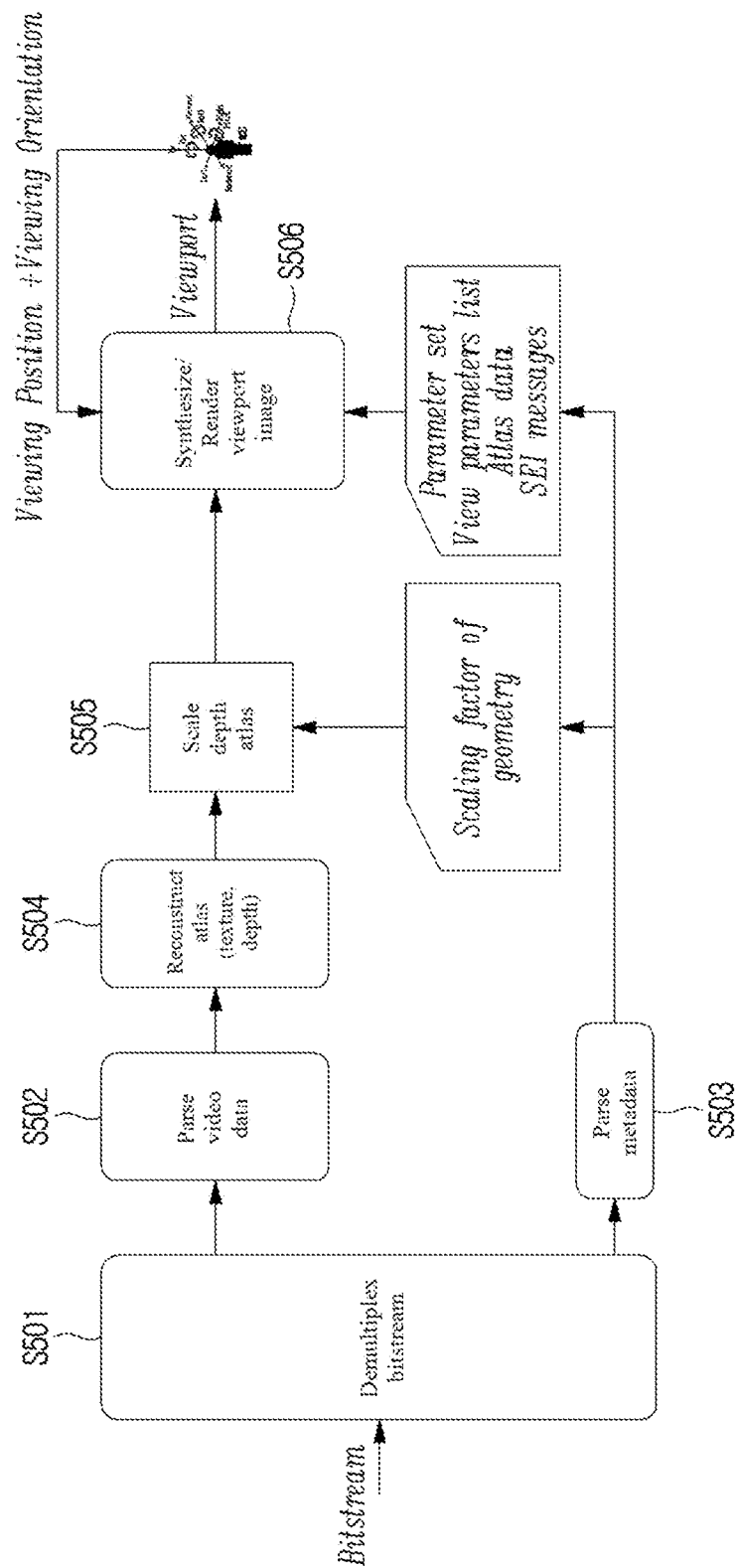
[FIG. 5]

[FIG. 6]
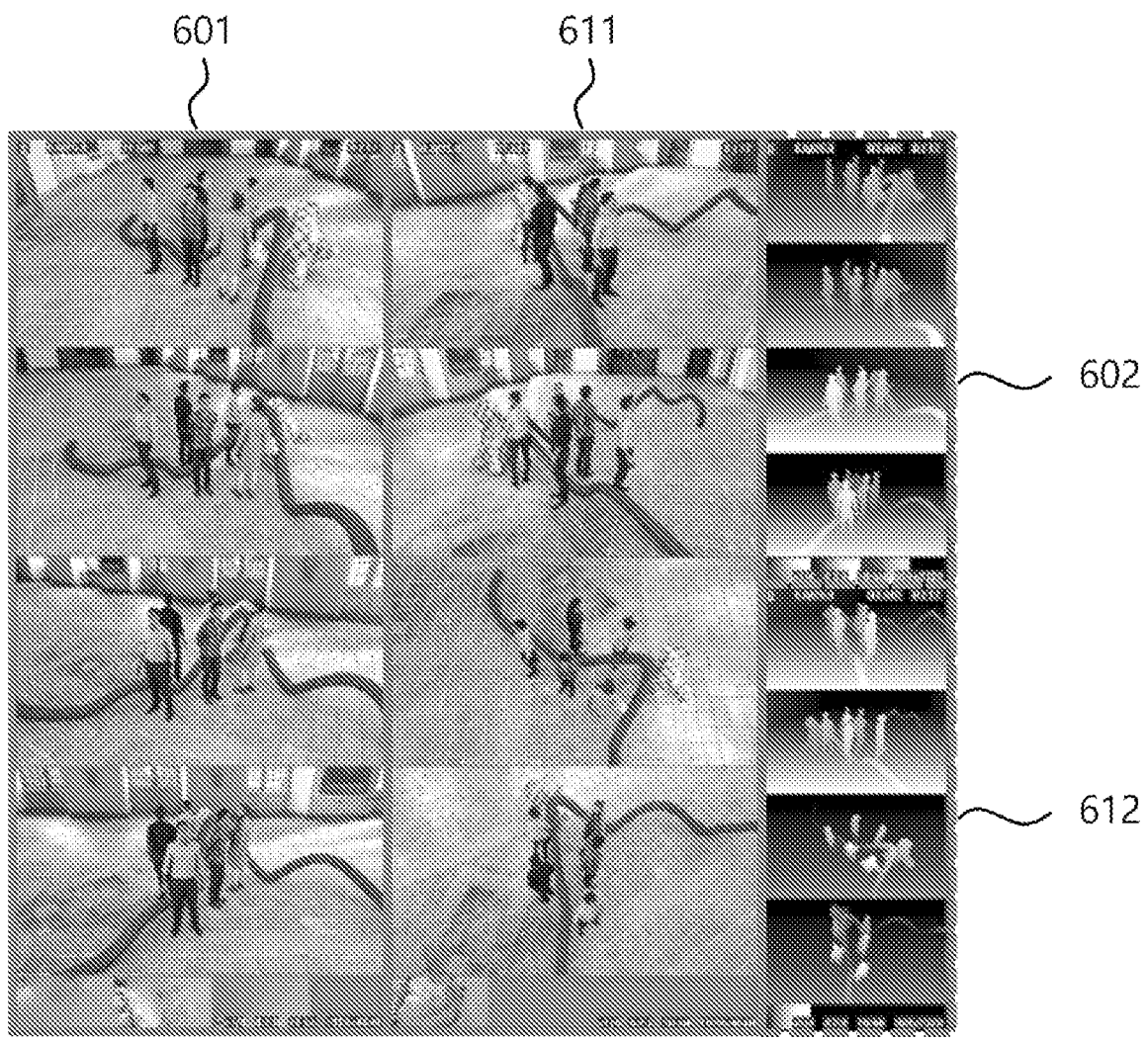

[FIG. 7]
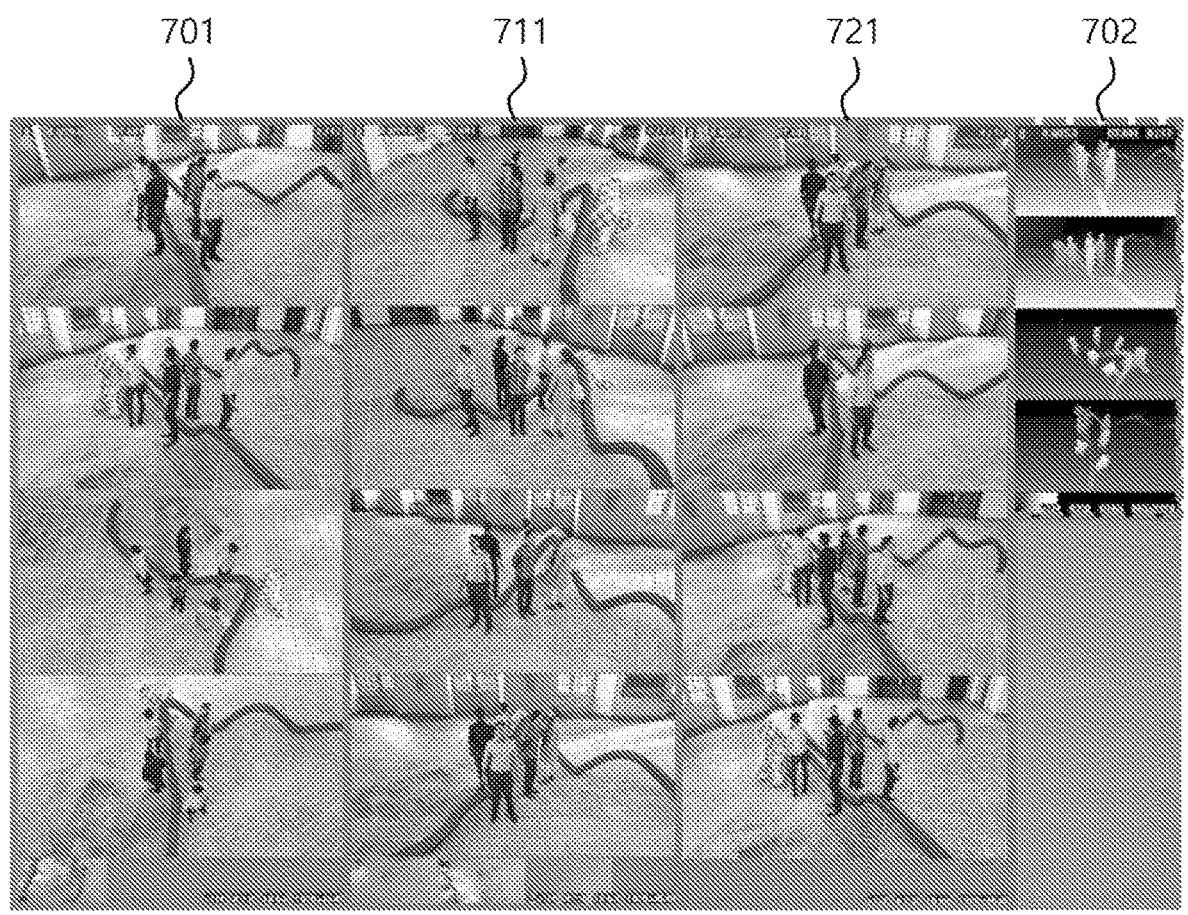

[FIG. 8]
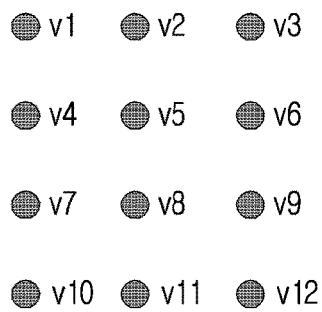
(a)
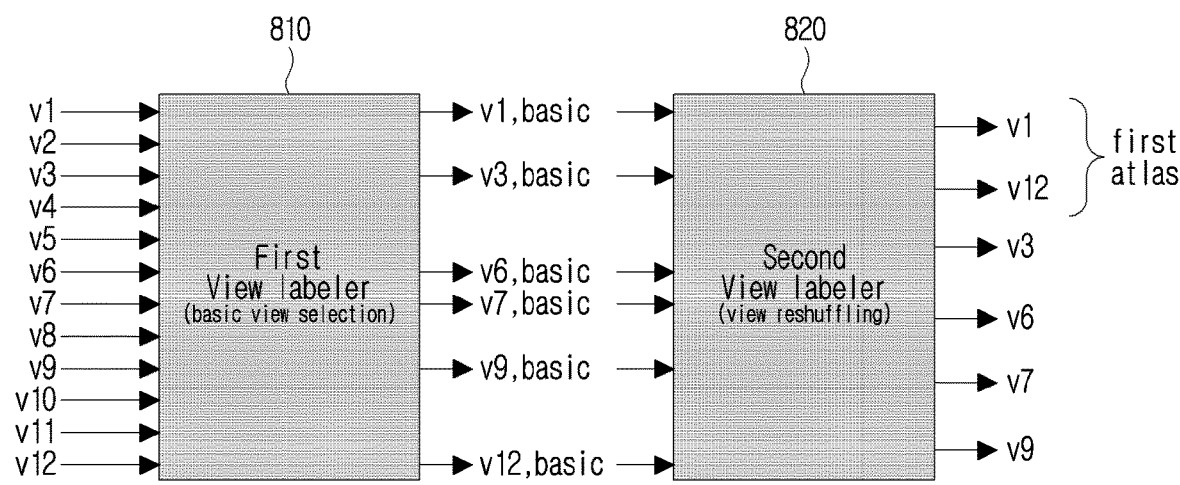
(b)

[FIG. 9]
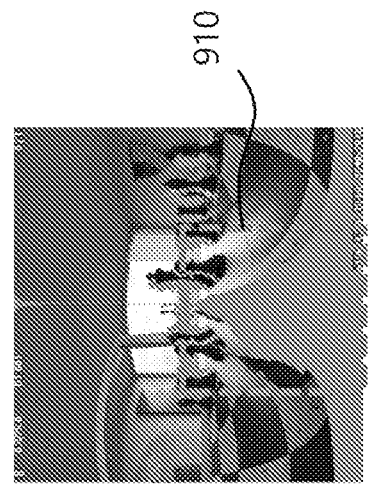
(c)
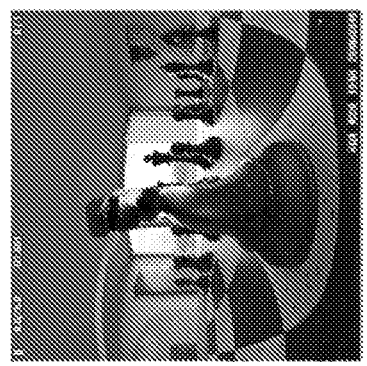
(b)
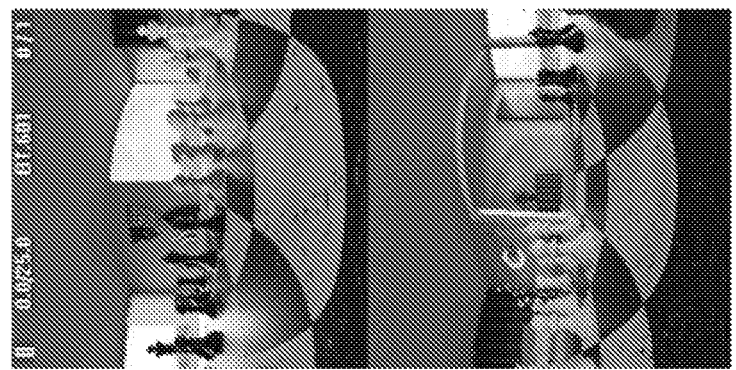
(a)

[FIG. 10]
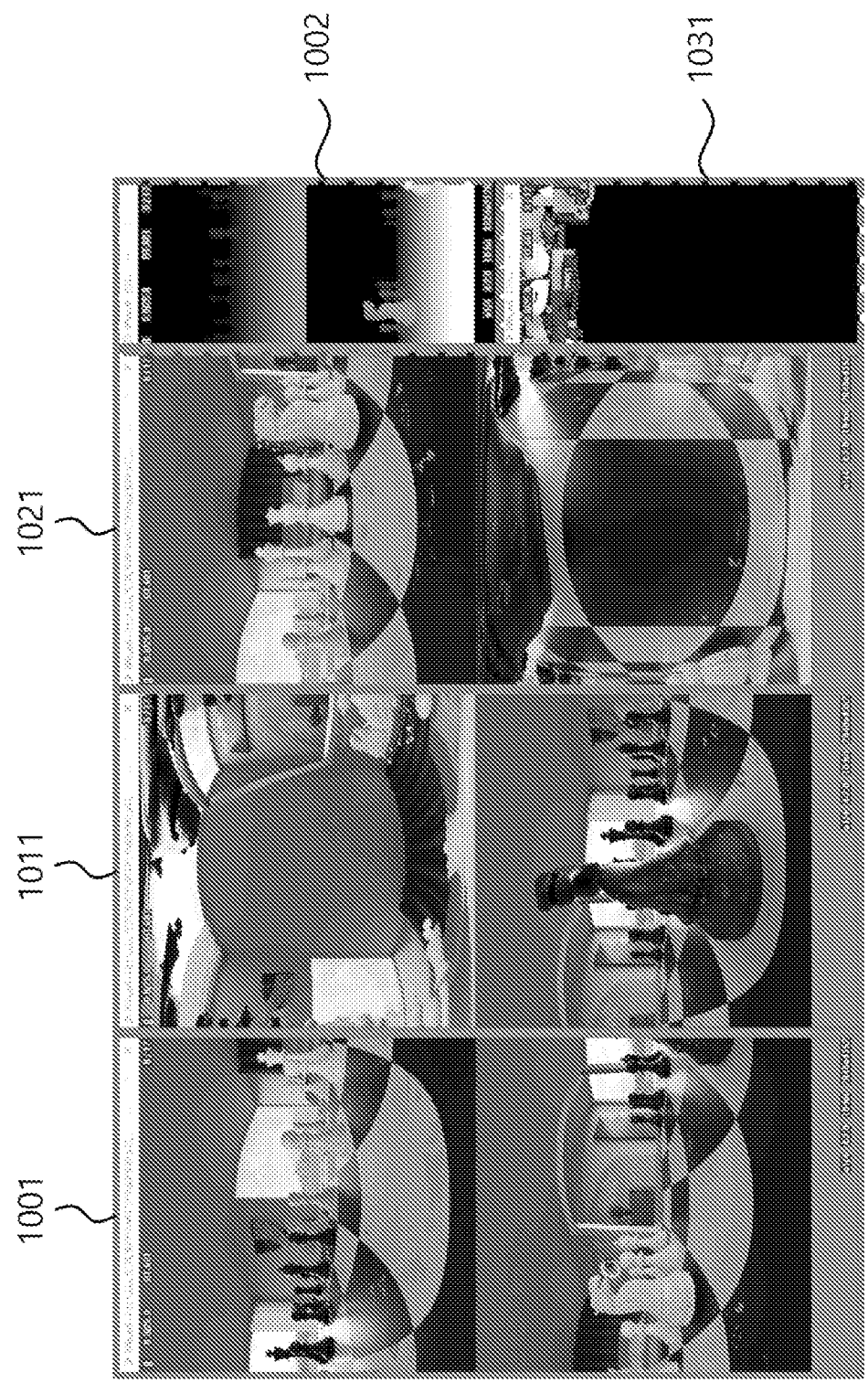

METHOD FOR DECODING IMMERSIVE VIDEO AND METHOD FOR ENCODING IMMERSIVE VIDEO

FIELD OF INVENTION

The present disclosure relates to a method for encoding/decoding an immersive video which supports motion parallax for a rotation and translation motion.

BACKGROUND OF THE INVENTION

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omnidirectional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Problem

The present disclosure is to provide a method of encoding/decoding depth information only for a part of view images.

The present disclosure is to provide a method of estimating depth information for a view image, for which depth information is not encoded/decoded, at a decoder side.

The present disclosure is to provide a method of generating depth atlases of which a number is less than a number of texture atlases The technical objects to be achieved by the present disclosure are not limited to the above-described technical objects, and other technical objects which are not described herein will be clearly understood by those skilled in the pertinent art from the following description.

Technical Solution

A method of encoding an immersive image according to the present disclosure comprises classifying a plurality of view images into a basic image and an additional image, generating a plurality of texture atlases based on the plurality of view images, generating a first depth atlas including depth information of view images included in a first texture atlas among the plurality of texture atlases, and generating a second depth atlas including depth information of view images included in remaining texture atlases other than the first texture atlas.

A method of encoding an immersive image according to the present disclosure comprises receiving a bitstream, and decoding a plurality of texture atlases, a first depth atlas, including depth information of view images included in a first texture atlas among the plurality of texture atlases, and a second depth atlas, including depth information of view images included in remaining texture atlases excluding the first texture atlas.

In an encoding/decoding method according to the present disclosure, reshuffling basic images may be further included, and the reshuffling may be performed based on a distance between the basic images.

In an encoding/decoding method according to the present disclosure, two basic images having a farthest distance among the plurality of basic images may be packed in the first texture atlas.

In an encoding/decoding method according to the present disclosure, depth patches of view images included in the remaining atlases may be packed in the second depth atlas.

In an encoding/decoding method according to the present disclosure, a depth patch may be generated by pruning with the two basic images included in the first texture atlas.

In an encoding/decoding method according to the present disclosure, depth information of a view image classified as a basic image among view images included in the remaining texture atlases may not be included in the second depth atlas.

In an encoding/decoding method according to the present disclosure, an atlas identifier different from those of the plurality of texture atlases and the first depth atlas may be assigned to the second depth atlas.

In an encoding/decoding method according to the present disclosure, at least one of a first flag indicating whether a texture atlas corresponding to an atlas identifier exists and a second flag indicating whether a depth atlas corresponding to the atlas identifier exists is encoded/decoded for each of atlas identifies.

The characteristics which are simply summarized above for the present disclosure are just an illustrative aspect of a detailed description of the after-described present disclosure and do not limit a range of the present disclosure.

Technical Effects

According to the present disclosure, amount of information that is signaled is reduced as depth information is encoded/decoded only for a part of view images.

According to the present disclosure, a method of estimating depth information for a view, for which depth information is not encoded/decoded, at a decoder side.

According to the present disclosure, amount of information to be encoded/decoded can be reduced by generating depth atlases of which a number is less than a number of texture atlases.

Effects achievable by the present disclosure are not limited to the above-described effects, and other effects which are not described herein may be clearly understood by those skilled in the pertinent art from the following description.

BRIEF DESCRIPTION OF DRAWINGS

FIG. 1 is a block diagram of an immersive video processing device according to an embodiment of the present disclosure.

FIG. 2 is a block diagram of an immersive video output device according to an embodiment of the present disclosure.

FIG. 3 is a flow chart of an immersive video processing method.

FIG. 4 is a flow chart of an atlas encoding process.

FIG. 5 is a flow chart of an immersive video output method.

FIGS. 6 and 7 are diagrams comparing a case where a depth atlas is generated for each of the texture atlases and a case where a depth atlas is generated only for some of the texture atlases.

FIG. 8 is a diagram illustrating an example in which basic viewpoint images are reshuffled.

FIG. 9 illustrates an example in which a partial region of a viewport image is rendered incorrectly.

FIG. 10 is a diagram for explaining an example in which depth information of view images included in a remaining texture atlas is encoded as well as depth information of view images included in a first texture atlas.

DETAILED EMBODIMENTS

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's watching position is changed, refers to an image that a viewport may be also dynamically changed. In order to implement an immersive video, a plurality of input images are required. Each of a plurality of input images may be referred to as a source image or a view image. A different view index may be assigned to each view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an video encoding unit 140 and a bitstream generation unit 150.

An immersive video processing device receives a plurality of pairs of images, a camera internal variable and a camera external variable as an input value to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera internal variable includes a focal distance, a position of a principal point, etc. and a camera external variable includes a position, a direction, etc. of a camera. A camera internal variable and a camera external variable may be treated as a camera parameter or a view parameter.

A view optimizer 110 partitions view images into a plurality of groups. As view images are partitioned into a plurality of groups, independent encoding processing per each group may be performed. In an example, view images filmed by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on a camera parameter. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image filmed by a camera with a highest priority, a view image filmed by a camera with a lowest priority, a view image filmed by a camera at a predefined position (e.g., a central position) or a view image filmed by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a square image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry scaling factor x, a syntax representing a horizontal directional reduction ratio of a depth atlas, and geometry scaling factor y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be set.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an unpruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize generated patches, size/position information of each patch and a camera parameter, etc. may be used.

Depending on the number of view images, a plurality of atlases may be generated. In this case, it may be set that only the basic image(s) can be packed in at least one of the plurality of atlases. For example, when three atlases are generated, for the first atlas, only at least one basic image can be packed in, and a patch extracted from an additional image cannot be packed in. For example, two basic images may packed in the first atlas. Here, the first atlas may mean one having an identifier whose the value is smallest among a plurality of atlases.

By packing each of texture information and depth information, a texture atlas and a depth atlas, respectively, may be generated. Here, the texture component may be referred to as an attribute component.

A different atlas identifier may be assigned to each of the texture atlas and depth atlas pairs. For example, when there are three texture atlas and depth atlas pairs, identifiers of 0, 1, and 2 may be assigned to each pair. That is, the atlas identifier 0 may be assigned to the first texture atlas and the first depth atlas, and the atlas identifier 1 may be assigned to the second texture atlas and the second depth atlas.

An immersive image output device may synthesize and render an immersive image using texture information restored from a texture atlas and depth information restored from a depth atlas.

However, if there should encode all the depth information of each viewpoint, there may occur a problem that the amount of data to be encoded/decoded highly increases. Accordingly, the present disclosure proposes a method of encoding/decoding depth information for only some of a plurality of view images.

According to an embodiment of the present disclosure, in the atlas generating step S316, when a plurality of texture atlases are generated, depth information is encoded only for view images packed in a part of the plurality of texture atlases, and then signaled. And, encoding depth information may be omitted for view images packed in the remaining atlases.

A part of texture atlases may be at least one predefined texture atlas among a plurality of texture atlases. Here, the at least one predefined texture atlas may include at least one of a first texture atlas among a plurality of texture atlases and a texture atlas in which only basic image(s) are packed.

Here, the first texture atlas may represent the one having the smallest identifier value among a plurality of texture atlases. For example, when the identifiers of the three texture atlases are 0, 1, and 2, respectively, a texture atlas having an identifier of 0 (i.e., the first one among the texture atlases) may be referred to as a first texture atlas.

For example, if it is assumed that three texture atlases are generated, identifiers 0, 1, and 2 may be assigned to each of the three texture atlases, respectively. In this case, depth information may be encoded only for view images packed in a texture atlas having an identifier of 0. Specifically, a depth atlas may be generated by packing a depth image of each view image included in a texture atlas having an identifier of 0, and the generated depth atlas may be encoded and signaled. On the other hand, depth information for view images included in any of the texture atlas having an identifier of 1 and the texture atlas having an identifier of 2 may not be encoded/decoded.

FIGS. 6 and 7 are diagrams comparing a case where a depth atlas is generated for each of the texture atlases and a case where a depth atlas is generated only for some of the texture atlases.

First, FIG. 6 illustrates an example in which depth atlases corresponding to each of the two texture atlases are generated. Specifically, referring to FIG. 6, it is exemplified that a first depth atlas 602 corresponding to the first texture atlas 601 is generated, and a second depth atlas 612 corresponding to the second texture atlas 611 is generated.

On the other hand, referring to FIG. 7, it is exemplified that a depth atlas is generated only for a view image included in a first texture atlas among three texture atlases. Specifically, a first depth atlas 702 corresponding to the first texture atlas 701 is generated, but depth atlases corresponding to the second texture atlas 711 and the third texture atlas 721 are not generated.

After performing the atlas reconstruction step S504, at the decoder side, depth information of a view image for which depth information is not signaled may be estimated. Specifically, the decoder may estimate a depth image of a view image to which depth information is not signaled by using available texture information and available depth information.

Meanwhile, the encoder may select base images and reshuffle the selected base images in order to improve the efficiency of depth estimation. Reshuffling may be performed in consideration of a distance between selected basic images. Through reshuffling, basic images having the farthest distance from each other can be included in the first atlas.

FIG. 8 is a diagram illustrating an example in which basic viewpoint images are reshuffled.

FIG. 8 (a) shows the spatial position of each view image, and FIG. 8 (b) shows an example in which reshuffling is performed based on the spatial position of each view image.

The reshuffling process may be executed by the viewpoint optimization unit 110.

In the example shown in FIG. 8 (b), the first view labeler 810 may select at least one basic image from among a plurality of input view images. Referring to FIG. 8 (b), it is exemplified that v1, v3, v6, v7, v9, and v12 are selected as basic images among view images v1-v12.

The second view labeler 820 may reshuffle a plurality of basic images. Reshuffling may be performed based on a distance between a plurality of basic images. For example, through reshuffling, basic images may be rearranged so as to pack the two basic images having the farthest distance into one atlas.

Referring to FIG. 8 (a), it is shown that v1 and v12 have the longest distance among the basic images. Accordingly, rearrangement in which the lowest indices are assigned to the basic images v1 and v12 may be performed through the reshuffling process of FIG. 8 (b).

The atlas generation unit 120 may generate an atlas based on the rearranged basic images through reshuffling. For example, as shown in FIG. 8 (b), two basic images having the farthest distance from each other among the rearranged basic images may be packed in the first atlas.

Meanwhile, through the bitstream, information indicating whether a texture atlas exists or not and information indicating whether a depth atlas exists or not may be encoded respectively as metadata and then signaled. For example, the syntax vps_attribute_video_present_flag[atlasID] indicates whether a texture atlas having an identifier of atlasID exists, and the syntax vps_geometry_video_present_flag[atlasID] indicates whether a depth atlas having an identifier of atlasID exists.

When depth information is generated only for a view image included in a first texture atlas among a plurality of texture atlases, the syntax vps_geometry_video_present_flag will be set to 1 for an atlas whose atlasID is 0. On the other hand, for an atlas whose atlasID is greater than 0, the syntax vps_geometry_video_present_flag will be set to 0.

Information indicating whether depth information has been encoded only for the view image included in the first atlas among the plurality of texture atlases may be encoded and signaled. For example, the syntax vps_first_atlas_geometry_flag indicates whether depth information is encoded only for a first atlas among a plurality of texture atlases. When depth information is encoded only for the first atlas among the plurality of texture atlases, the value of the syntax vps_first_atlas_geometry_flag may be set to 1. Otherwise, the value of the syntax vps_first_atlas_geometry_flag may be set to 0. When the syntax vps_first_atlas_geometry_flag is 1, encoding the syntax vps_geometry_video_present_flag for each atlas may be omitted. On the other hand, when the syntax vps_first_atlas_geometry_flag is 0, the syntax vps_geometry_video_present_flag may be encoded and signaled for each of the atlases.

As described above, when depth information is encoded and signaled only for a view image included in a first texture atlas among a plurality of texture atlases, the amount of data to be encoded/decoded is reduced. The decoder may estimate depth information of a view image, in which the depth information is not, encoded using depth information of the view image included in the first texture atlas. Specifically, the depth information of the view image for which the depth information is explicitly signaled is reprojected onto the position of the view image for which the depth information is not signaled. And then, the depth information of the position required when synthesizing the viewport image can be estimated. However, since there is no additional depth information other than the depth information of the view image included in the first texture atlas, a partial region of the viewport image may be rendered incorrectly.

FIG. 9 illustrates an example in which a partial region of a viewport image is rendered incorrectly.

FIG. 9 (a) shows the first atlas. For view images included in the first atlas, depth information may be explicitly encoded and signaled. FIG. 9 (b) represents a view image to be rendered, and FIG. 9 (c) represents an actually rendered view image.

Comparing FIG. 9 (a) and FIG. (b), data related to the knight (chess piece) is not included in FIG. 9 (a). Accordingly, based on the depth information of the view images shown in FIG. 9 (a), it is impossible to accurately estimate the depth information of the knight. For example, depth information corresponding to the knight is estimated based on depth information corresponding to the background of the view image shown in FIG. 9 (a). As a result, as in the example shown in FIG. 9 (c), the area 910 corresponding to the knight is rendered incorrectly.

In order to prevent the above problem, depth information of a view image included in a first texture atlas among a plurality of texture atlases may be encoded and signaled, and depth information of view images included in another texture atlas may be further encoded and signaled. At this time, in order to minimize the amount of data to be encoded/decoded, for view images included in the texture atlas other than the first texture atlas, the depth image is pruned, and then a depth atlas, packed with only the pruned depth patches, may be generated. Specifically, for view images included in the texture atlas other than the first texture atlas, depth patches, which is generated by removing overlapping data with view images included in the first texture atlas, may be generated.

FIG. 10 is a diagram for explaining an example in which depth information of view images included in a remaining texture atlas is encoded as well as depth information of view images included in a first texture atlas.

First, overall depth information may be encoded for view images included in the first texture atlas 1001. That is, a first depth atlas 1002 including depth pixels corresponding to each of the texture pixels (or, sampled texture pixels) in the first texture atlas 1001 may be generated and encoded.

For view images included in the remaining texture atlases 1011,1021 other than the first texture atlas 1001, only depth information that does not overlap with view images included in the first texture atlas 1001 is encoded.

To this end, data, overlapping with view images included in the first texture atlas 1001, may be removed through pruning. In addition, pruning may be performed between view images included in the remaining texture atlases 1011, 1021 to remove redundant data between view images included in the remaining texture atlases 1011, 1021. For example, pruning priority may be set as follows.

1) view image included in the first texture atlas (i.e., basic image included in the first texture atlas)
2) basic image included in remaining texture atlas
3) additional images included in the remaining texture atlas For example, a depth patch for a basic image included in the second texture atlas 1011 or the third texture atlas 1021 may be generated through pruning with a view image included in the first texture atlas 1001. In addition, the depth patch for the additional image included in the second texture atlas 1011 or the third texture atlas 1021 may be generated through a first pruning using the view image included in the first texture atlas 1001 and a second pruning using the basic image included in the second texture atlas (1011) or the third texture atlas (1021). The depth patch for the additional image included in the second texture atlas 1011 or the third texture atlas 1021 may be generated further perform a third pruning using other additional images included in the second texture atlas 1011 or the third texture atlas 1021.

Meanwhile, the number of depth atlases including depth information of view images included in the remaining texture atlases 1011, 1021 excluding the first texture atlas 1001 may be less than the number of the remaining texture atlases 1011, 1021. For example, in the example shown in FIG. 8, the first depth atlas 1002 includes depth information of view images included in the first texture atlas 1001 among the three texture atlases 1001, 1011, and 1021. Meanwhile, the second depth atlas 1031 may include depth information of view images included in the remaining two texture atlases 1011, 1021.

Meanwhile, among view images included in the remaining texture atlases 1011, 1021 excluding the first texture atlas 1001, encoding depth information for the basic image may be omitted, and only depth information for the additional image may be encoded. That is, in the second depth atlas 1031, the depth information of the basic image included in the remaining texture atlases (i.e., the second texture atlas 1011 and the third texture atlas 1021) is not included, and only depth information of the additional image included in the remaining texture atlases 1011, 1021 may be included.

As in the example shown in FIG. 7, when only the depth information of the view image included in the first texture atlas is encoded among the three texture atlases, a total of four atlases (three texture atlases and one depth atlas) are generated. On the other hand, as in the example shown in FIG. 10, when not only the depth information of the view image included in the first texture atlas, but also the depth information of the view image included in the remaining texture atlas are additionally encoded, a total of five atlases (three texture atlases and two depth atlases) are generated.

Meanwhile, when the depth patches of the view image included in the remaining texture atlases are packed into one depth atlas, different identifiers may be assigned to the texture atlases and the depth atlases. That is, identifier 0 may be commonly assigned to the first texture atlas and the corresponding first depth atlas, but, identifiers 1, 2, and 3 may be assigned to the second texture atlas, the third texture atlas, and the second depth atlas, respectively.

In this case, for an atlas having an identifier of 0, the syntax vps_attribute_video_present_flag and the syntax vps_geometry_video_present_flag may be set to 1. On the other hand, for an atlas having an identifier of 1 or 2, the syntax vps_attribute_video_present_flag may be set to 1, whereas the syntax vps_geometry_video_present_flag may be set to 0. On the other hand, for an atlas having an identifier of 3, the syntax vps_attribute_video_present_flag may be set to 0, whereas the syntax vps_geometry_video_present_flag may be set to 1.

On the decoder side, before estimating depth information, a depth map corresponding to each view image should be reconstructed. Texture data of each view image may be restored through an unpacking process. In addition, a depth map of a view image, in which depth information is explicitly encoded, may also be restored through an unpacking process. On the other hand, a depth map of a view image in which depth information is not encoded may be generated by referring to a depth map of another view image.

In this case, referring to FIG. 8, the depth map for the view image included in the first texture atlas is fully occupied. On the other hand, an unoccupied area such as a hole may exist in the depth map for the view image included in the remaining texture atlas. The hole may be filled through a depth estimation process.

As described above, in order to reduce the amount of depth information to be encoded/decoded, the first encoding method of encoding only the depth information of the view image included in the first texture atlas among a plurality of texture atlases, or a second encoding method of encoding not only depth information of the view image included in the first texture atlas but also depth information of the view images included in the remaining texture atlases may be applied.

In this case, information indicating which one among the first encoding method and the second encoding method is applied may be encoded as metadata and signaled. The information may be a 1-bit flag or information indicating the number of depth atlases.

Alternatively, one of the first encoding method and the second encoding method may be selected based on the number of view images or the number of texture atlases. For example, when the number of view images or texture atlases is smaller than the threshold value, the first encoding method may be applied. On the other hand, when the number of view images or texture atlases is equal to or greater than the threshold value, the second encoding method may be applied.

A name of syntax elements introduced in the above-described embodiments is just temporarily given to describe embodiments according to the present disclosure. Syntax elements may be named differently from what was proposed in the present disclosure.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of encoding an immersive image, the method comprising
   classifying a plurality of views into a basic view and an additional view;
   pruning a current view with the basic view, the current view being the additional view;
   generating a texture atlas based on patches from a pruned view of the current view; and
   generating a bitstream by encoding the texture atlas,
   wherein depth values of the current view corresponding to texture samples in the texture atlas are not encoded into the bitstream, but instead, reference depth values to estimate the depth values at the decoder side are encoded into the bitstream.

2. The method of claim 1, wherein the depth values of the current view are reconstructed by reprojecting the reference depth values onto the current view.

3. The method of claim 1, wherein a flag representing whether the depth values of the current view are present in the bitstream or not is encoded into the bitstream.

4. A method of decoding an immersive image, the method comprising:
   receiving a bitstream;
   decoding a plurality of texture atlases; and
   reconstructing textures samples of a current view by decoding a plurality of texture atlases in the bitstream,
   wherein the method further comprises:
   determining whether depth values corresponding to the texture samples of the current view are present in the bitstream or not, and
   wherein in response to the depth values corresponding to the texture samples of the current view being not present in the bitstream, the depth values corresponding to the texture samples are obtained based on reference depth values decoded from the bitstream.

5. The method of claim 4, wherein the depth values of the current view are obtained by reprojecting the reference depth values onto the current view.

6. The method of claim 4, wherein determination of whether the depth values corresponding to the texture samples of the current view are present in the bitstream or not is based on a flag decoded from the bitstream.

7. The method of claim 4, wherein in response to the depth values corresponding to the texture samples of the current view being not present in the bitstream, the depth values are obtained by estimating thereof at a decoder side.

8. A non-transitory computer-readable recording medium storing program instructions when executed cause a computer or processor to perform an encoding method comprising:
   classifying a plurality of views into a basic view and an additional view;
   pruning a current view with the basic view the current view being the additional view;
   generating a texture atlas based on patches from a pruned view of the current view; and
   generating a bitstream by encoding the texture atlas,
   wherein depth values of the current view corresponding to texture samples in the texture atlas are not encoded into the bitstream, but instead, reference depth values to estimate the depth values at the decoder side are encoded into the bitstream.

* * * * *